(12) United States Patent
Ciniglio

(10) Patent No.: US 6,364,194 B1
(45) Date of Patent: Apr. 2, 2002

(54) SOLDERING APPARATUS

(75) Inventor: Alexander James Ciniglio, Great Dunmow (GB)

(73) Assignee: Evenoak Limited (GB)

( * ) Notice: Subject to any disclaimer, the term of this patent is extended or adjusted under 35 U.S.C. 154(b) by 0 days.

(21) Appl. No.: 09/511,742

(22) Filed: Feb. 24, 2000

(51) Int. Cl.7 .................................................. B23K 1/08
(52) U.S. Cl. ............................. 228/36; 228/37; 228/43; 269/903
(58) Field of Search .......................... 228/36, 212, 213, 228/39, 49.5, 44.7, 37, 43; 118/503; 269/903

(56) References Cited

U.S. PATENT DOCUMENTS

| | | | |
|---|---|---|---|
| 4,730,819 A | * | 3/1988 | Hirschhorn et al. |
| 4,948,108 A | * | 8/1990 | Sullivan |
| 5,067,648 A | * | 11/1991 | Cascini |
| 5,540,376 A | * | 7/1996 | Asla et al. |
| 5,611,480 A | | 3/1997 | Ciniglio ....................... 228/180 |
| 5,820,013 A | * | 10/1998 | Ortiz |
| 6,045,653 A | * | 4/2000 | Johnson |
| 6,164,516 A | * | 12/2000 | Watanabe et al. |

FOREIGN PATENT DOCUMENTS

| | | |
|---|---|---|
| EP | 860229 | 8/1998 |

* cited by examiner

*Primary Examiner*—Tom Dunn
*Assistant Examiner*—Jonathan Johnson
(74) *Attorney, Agent, or Firm*—Ostrolenk, Faber, Gerb & Soffen, LLP

(57) ABSTRACT

A carriage for a printed circuit board in a soldering apparatus has clamps which clamp opposite edges of the board to hold it during transport. As the carriage is lowered to a board delivery station, the clamp members are opened automatically. The board is slid between the clamp members and the carriage then raised, allowing the clamp members to close on the board.

10 Claims, 4 Drawing Sheets

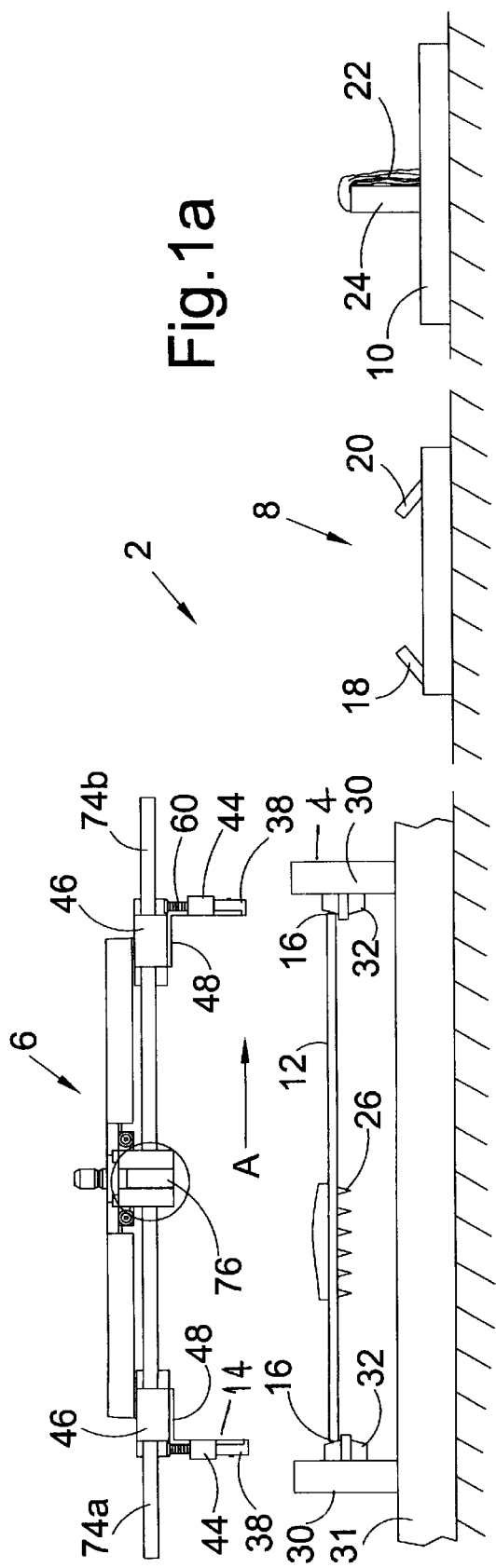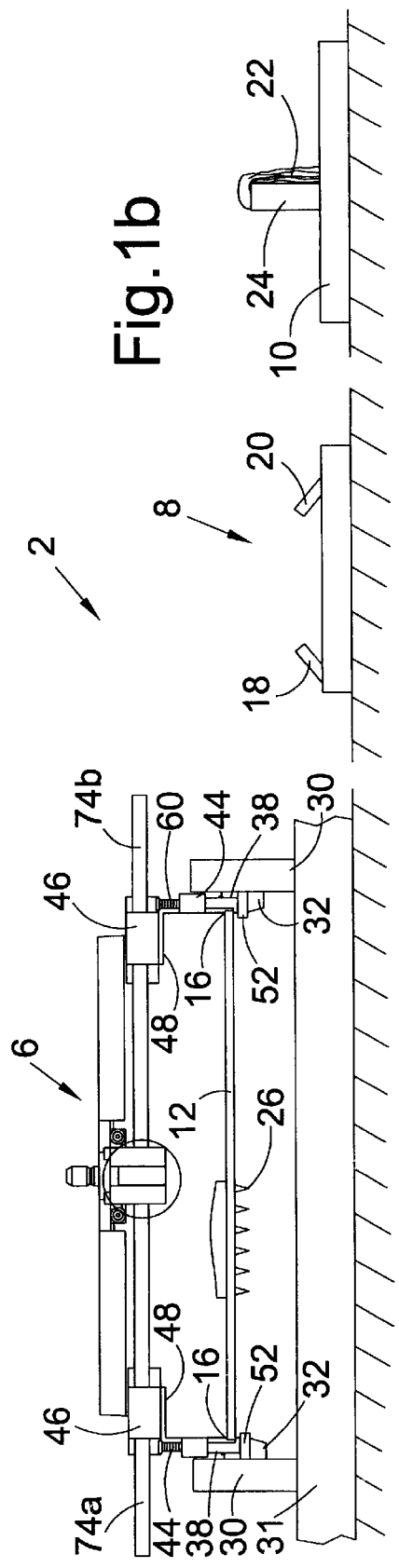

SOLDERING APPARATUS

The present invention relates to soldering apparatus, and in particular to a carriage for transporting printed circuit boards during an automated soldering operation.

BACKGROUND

EP 860 229 describes a carriage for raising, lowering and transporting a printed circuit board. Such carriages collect the board from a delivery station, transport the board into position above a solder bath and then raise and lower the board to dip component leads to solder them to the underside of the board. Such apparatus is well known in the art. In one type of prior art carriage, the board is held on the carriage by suction. Suckers descend down from the carriage and a suction is applied when the suckers are lowered on to the upper surface of the board. With this arrangement, a vacuum line must be carried by the carriage and the position of the suckers must be adjusted to suit different board designs—i.e. to attach to a suitable space on the board. In another arrangement, co-operating pincers hold the sides of the board. Each pincer has a cut-out and is pivoted inwards to trap the board edge in the cut-out. With this arrangement, pneumatic cylinders are carried on the carriage to pivot the pincers, and the position of the pincers must be adjusted to suit different board sizes.

SUMMARY OF THE INVENTION

In one aspect, the present invention provides a carriage in which opposed clamps each clamp an edge of the circuit board. The members of a clamp are biased to clamp the edges of the circuit board and co-operation of the clamp with a board delivery mechanism automatically separates the clamp members to allow entry and removal of the circuit board. Thus, the carriage need not carry vacuum lines or air lines.

The spacing between the clamps can be adjusted to accommodate different board widths. The clamps may be mounted on lead screws which are electrically rotated to adjust the spacing between the clamps to suit different width boards.

A clamp may comprise a first member having a flange on which the underside of the circuit board will rest, and a second member which is biased towards the flange to clamp the circuit board at its edge. This arrangement easily accomodates boards of different thickness as well as coping with a curved board.

In a particular arrangement, the carriage is lowered on to a track along which the circuit board can travel. The track has formations which cooperate with the clamp members to separate them as a clamp is lowered onto the track. A formation engages the second, upper clamp member to hold it as the carriage is lowered further to open apart the clamp members. A board is then delivered into the spaced apart clamps, sliding it lengthways between co-operating surfaces of the clamp members. As the carriage is raised, the upper clamp member moves back under the action of springs or the like to grip the circuit board.

If a clamp extends the full length of the circuit board it will have the added benefit of tending to straighten the edge of the board, removing some of the curvature which is a common problem when soldering circuit boards.

BRIEF DESCRIPTION OF THE DRAWINGS

FIGS. 1a, 1b and 1c show schematically a side view of part of a soldering apparatus incorporating the carriage of the present invention;

FIG. 2 shows a side view on arrow A of a delivery rail of the apparatus of FIG. 1a;

DESCRIPTION OF THE PREFERRED EMBODIMENT

Figure 1C:
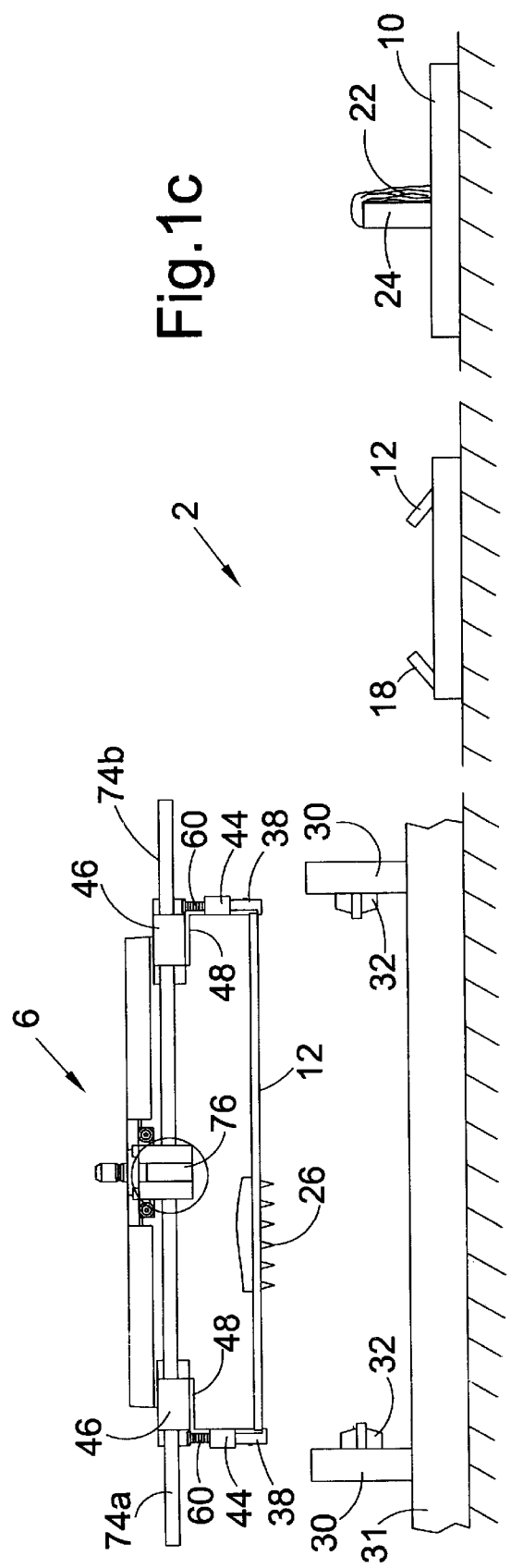

Referring to FIGS. 1a to 1c, a soldering apparatus 2 comprises a printed circuit board delivery rail mechanism 4, a carriage 6, a board curvature detection station 8, and a solder bath 10. The carriage 6 is lowered to engage the delivery rail mechanism 4 (FIG. 1b and FIG. 4), a board 12 is then slid into place between the clamps 14 of the carriage 6, the carriage 6 is raised (FIG. 1c), the clamps 14 gripping the board 12 at its edges 16. The carriage 6 is then moved to above the curvature detection station, where the curvature of the board can be calculated by reflecting light form a source 18 onto a detector 20, as is well known in the art, and then to the solder bath 10. At the solder bath 10, solder 22 is pumped through a nozzle 24 and the carriage 6 is lowered to dip component leads 26 into the solder 22.

The carriage 6 is mounted on an overhead gantry for movement in three dimensions X, Y, Z, for rotation about the Z axis and also to enable tilting of the carriage 6 from the horizontal. In this way the board 12 can be positioned above the nozzle 24 to dip the leads of various components on the board, and also to rotate the board from the horizontal as the leads are dipped, as described for example in EP-A-860 229 and US-A-5 611 480 which are incorporated herein by reference. The movement of the carriage 6 is microprocessor controlled and pre-programmed according to the layout of components on the board.

The structure and operation of the clamps 14 of the carriage 6, which forms a particular aspect of this invention, will now be described in more detail.

Figure 2:
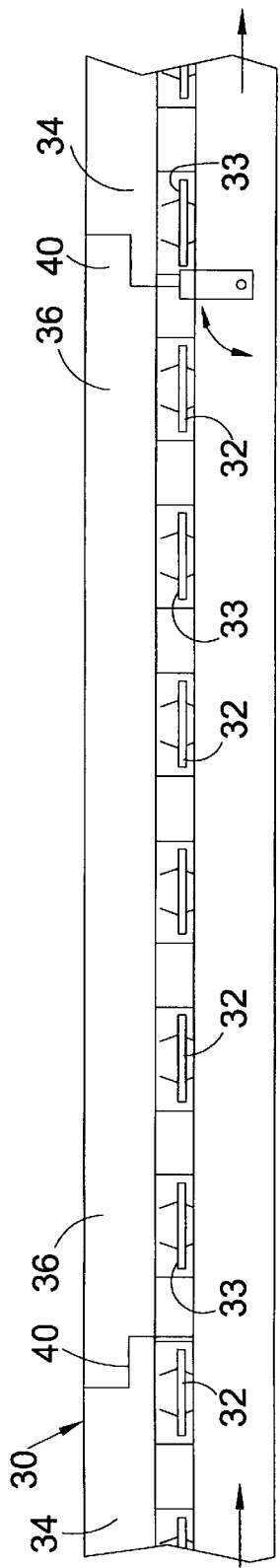

Referring firstly to FIG. 2, a delivery rail 30 has a plurality of rollers 32 which are rotated to move a board 12 along the rail 3. The board 12 is supported at its opposite edges 16 on the rollers 32 of two opposed rails 30 which are mirror images of each other. The board edges sit on circumferential shoulders 33 on the rollers 32. The rails 30 are mounted on transverse slides 31 (FIG. 1) and the spacing between rails is adjustable under microprocessor control to accomodate different board widths.

In the front face 34 of the rail 30, a recess 36 is provided to accomodate a first clamp member 38 of a clamp 14. At opposite end of the recess 36 is a step 40 for engaging ends 42 of the second clamp member 44 as the clamp 14 is lowered into the recess 36.

Figure 3:
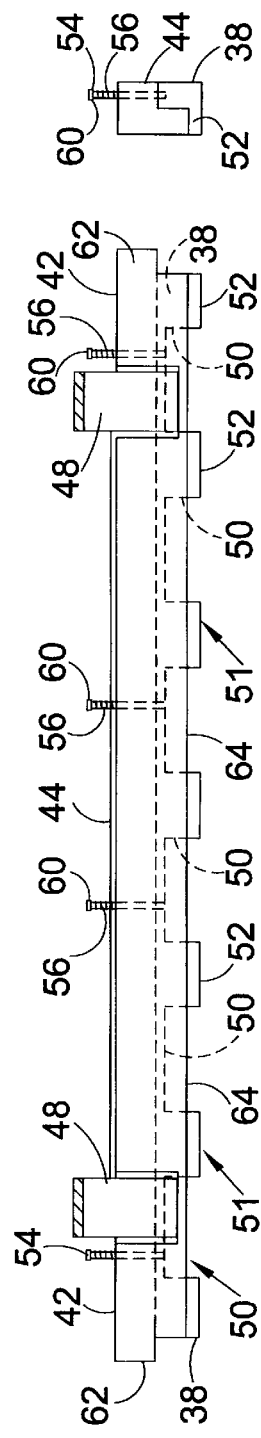
FIG. 3 shows a view on arrow B of a clamp of the carriage of FIG. 1a, with the circuit board removed.

Referring to FIGS. 1 and 3, the first clamp member 38 is attached to a bearing member 46 by an L-shaped bracket 48. Clamp member 38 has cut-outs 50 in its bottom edge 51 to accommodate the rollers 32. Between the cut-outs 50, flanges 52 are provided on the lower edge 51. The second clamp member 44 is mounted on the first member 38 by means of guide pins 54. Guide pins 54 are fixed in the top wall 55 of the first member 38 and pass through bushes (not shown) in the clamp member 44. A spring 56 is positioned between the top wall 58 of the second clamp member 44 and a flanged head 60 on the pin 54. Clamp member 44 has ears 62 extending from the opposite ends 42.

Figure 4:
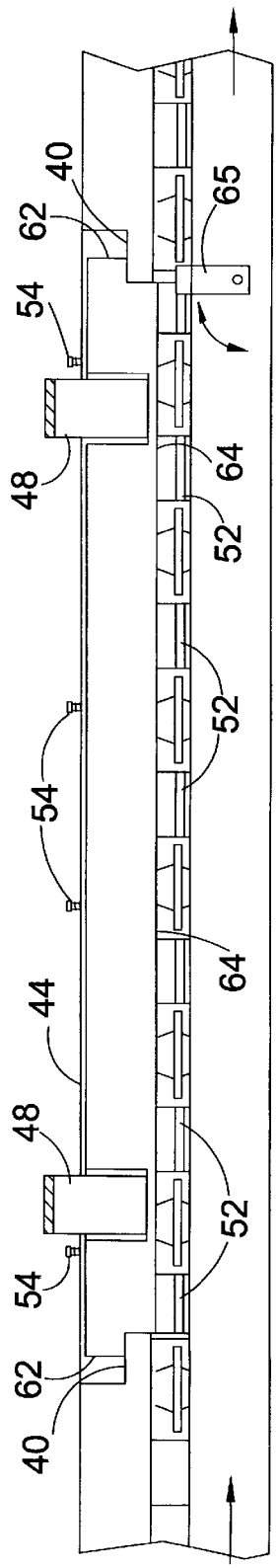
FIG. 4 shows the clamp of FIG. 3 lowered into position on the delivery rail of FIG. 2.

Referring to FIG. 4, when the clamp 14 is lowered into the recess 36, the ears 62 catch on the steps 40 to prevent further downward movement of the second clamp member 44. The first clamp member 38, which is mounted directly on the carriage 6 by the brackets 48, continues its downward movement to bring the flanges below the support shoulders 33 of rollers 32. The pins 54 slide through the second clamp member 44, compressing the springs 56. At this point, the clamp 14 is open and a circuit board 12 can be transported along the rails 30 with the edges 16 of the board passing between the flanges 52 of the first clamp member 38 and the bottom wall 64 of the second clamp member 44. A stop 65 limits the travel of the board 12. The carriage 6 is then raised. Springs 56 urge the second clamp member towards the printed circuit board 12 as the ears 62 lift clear of the steps 40, gripping the edge 16 of the board 12 between the clamp members 38,44.

After a soldering operation is performed, the carriage 6 returns to the delivery rails 30 and is lowered to cause the clamps to release the board (the reverse of the process described above to deposit the board on the shoulders 33 of the rollers 32. Stop 65 is lowered and the board can continue its travel along delivery rails 30 by rotation of the rollers 32.

Figure 5:
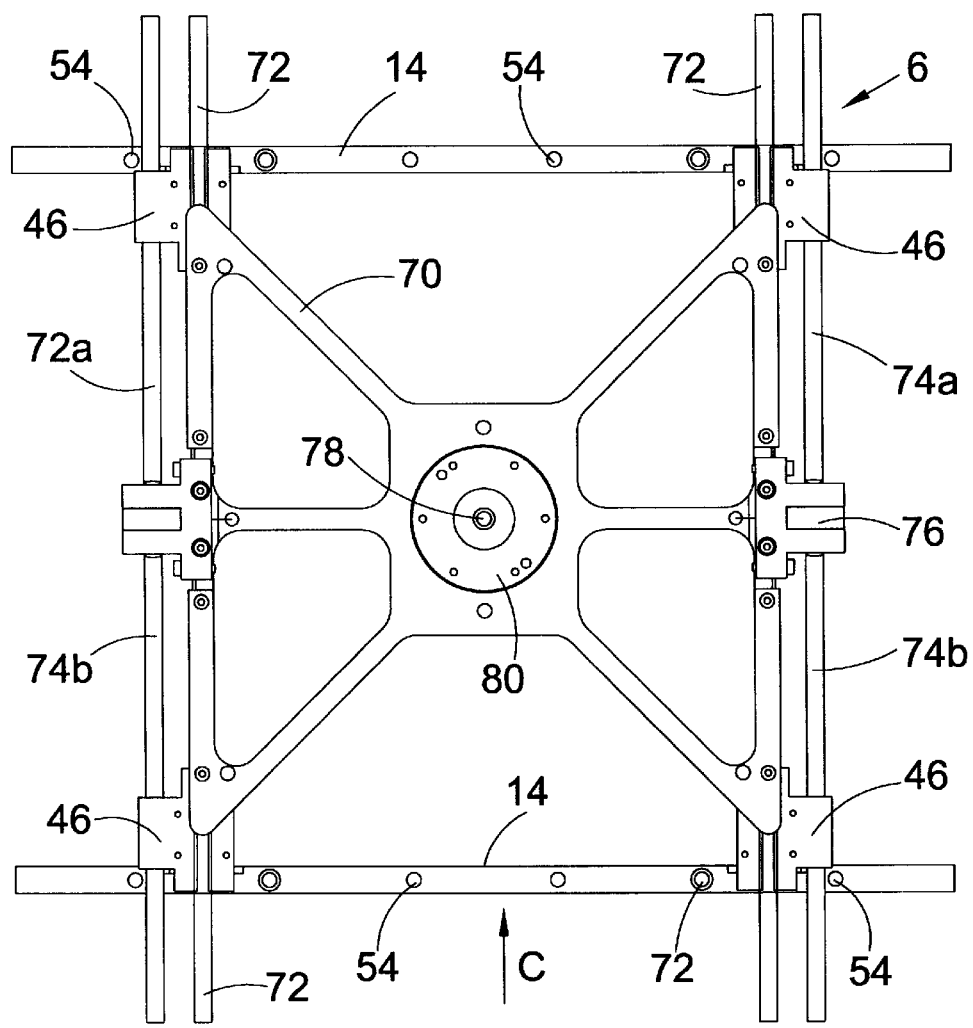
FIG. 5 is a plan view of the carriage of FIG. 1.
Figure 6:
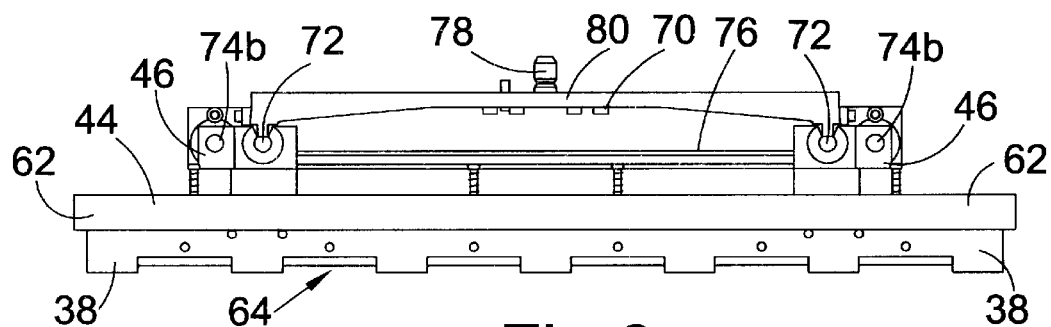
FIG. 6 is a side view on arrow C of FIG. 5.

Referring to FIGS. 5 and 6, other parts of the carriage 6 will be described in more detail.

The carriage 6 has a frame 70. Frame 70 supports two bearing rails 72. In turn, each rail 72 has bearings 46 slidably mounted on it. Bearings 46 carry clamps 14 by means of the brackets 48 described above. Pairs of bearings 46 supporting respective clamps 14 are moved together and apart by oppositely threaded lead screws 74a, 74b which are threadedly mounted in the bearings 46 and rotated by a toothed belt 76 which extends between the pairs of lead screws. Belt 76 s driven by an electric motor (not shown) to rotate the lead screws 74a, 74b and so move the bearings 46, supporting respective clamps 14, towards and away from each other. The frame 70 has a stub shaft 78 and mounting plate 80 for mounting the carriage 6 on the transport mechanism (not shown).

What is claimed is:

1. A soldering apparatus having a carriage for holding and moving a circuit board within the apparatus during an automated soldering operation, the carriage comprising a pair of opposed clamps, which, in use, clamp opposed edges of such circuit board, and wherein each clamp comprises first and second jaw members which are urged together by a spring to provide a clamping action, the first jaw member extending beneath an underside of the circuit board and the second jaw member bearing on an upper surface of the circuit board to hold the board in clamping engagement between the first and second jaw members, and the first and second jaw members being urged apart against the force of the spring to release the board, and the jaw members extending along a respective edge of such board and when urged apart defining an opening at ends of the jaw members for such board to be slid between the jaw members;

a board delivery mechanism for transporting such board linearly through the apparatus, the carriage being adapted to receive a board from the mechanism and to deposit the board on the mechanism, wherein the clamp members engage with rails of the delivery mechanism, the clamp members being urged apart against the force of the spring on engagement with the rails to allow a board on the delivery mechanism to be slid through the openings defined by the jaw members.

2. Apparatus as claimed in claim 1, wherein the spacing between the clamps is adjustable to accommodate different board widths.

3. Apparatus as claimed in claim 2, wherein a microprocessor control is provided to adjust the spacing between the clamps.

4. Apparatus as claimed in claim 1, wherein the clamps are mounted on lead screws which are rotated to adjust the spacing between the clamps to suit different width boards.

5. Apparatus as claimed in claim 4, wherein such clamp comprises a first member having a flange on which the underside of a circuit board will rest, and a second member which is biased towards the flange to clamp the circuit board at its edge.

6. A soldering apparatus having a carriage for moving a circuit board within the apparatus, the carriage comprising a pair of opposed clamps each clamp clamping an edge of the circuit board, wherein each said clamp comprises two clamp members which are biased into clamping relationship to clamp an edge of the circuit board, and further comprising a board delivery mechanism for transporting the board through the apparatus, the clamp members engaging with the delivery mechanism to receive a board from the delivery mechanism and to deposit the board on the delivery mechanism, and the clamp members automatically separating on engagement with the delivery mechanism to enable a board to be slid between the clamp members.

7. A soldering apparatus having a carriage for moving a circuit board within the apparatus, the carriage comprising a pair of opposed clamps, each clamp extending longitudinally and the clamps clamping the circuit board substantially along the full length of respective opposed edges of the circuit board, wherein each said clamp comprises two clamp members which are biased into clamping relationship, to clamp an edge of the circuit board, and further comprising a board delivery mechanism for transporting the board through the apparatus, and the clamp members automatically separating on engagement with the delivery mechanism, the delivery mechanism being adapted to slide the board in the longitudinal direction between the clamp members.

8. Apparatus as claimed in claim 7, wherein a clamp extends the full length of a circuit board to be carried.

9. Soldering apparatus for soldering a printed circuit board, comprising a carriage with a clamp which extends, in use, along an edge of the circuit board, the clamp having a first clamp member having a laterally extending flange for supporting an underside of the circuit board, and a second clamp member which is urged onto an upper side of the circuit board and towards the flange by a spring force to clamp the board between the second clamp member and the flange, wherein the second clamp member is slidably mounted on the first clamp member to slide in a direction perpendicular to the plane of a circuit board mounted in the clamp and held in clamping position by the spring force and a board delivery mechanism for translating the board in a generally horizontal direction, wherein the delivery member co-operates with the clamp to urge the second clamp member away from the flange when the carriage is brought into engagement with the delivery mechanism to receive the board.

10. Soldering apparatus as claimed in claim 9, wherein the second clamp member is slidably mounted on pins which are mounted on the first clamp member, the pins extending in a direction perpendicular to the flange.

\* \* \* \* \*